United States Patent
Ashford et al.

(10) Patent No.: US 8,899,535 B2
(45) Date of Patent: Dec. 2, 2014

(54) MOUNT FOR A CALIBRATION STANDARD

(75) Inventors: Curtis M. Ashford, St. Peters, MO (US); Brian A. Bollinger, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 13/440,168

(22) Filed: Apr. 5, 2012

(65) Prior Publication Data

US 2013/0264438 A1    Oct. 10, 2013

(51) Int. Cl.
 *F16M 11/00*    (2006.01)

(52) U.S. Cl.
 USPC ............... 248/161; 248/163.1; 248/444.1

(58) Field of Classification Search
 USPC ........ 351/223; 348/187; 248/161, 441.1, 453, 248/455, 346.01, 163.1, 172, 440
 See application file for complete search history.

(56) References Cited

U.S. PATENT DOCUMENTS

| | | | |
|---|---|---|---|
| 1,601,220 A * | 9/1926 | Leu et al. | 40/624 |
| 5,646,859 A | 7/1997 | Petta | |
| 5,959,225 A * | 9/1999 | Hsu | 84/327 |
| 6,484,977 B1 * | 11/2002 | Yu | 248/125.1 |
| 7,158,241 B2 | 1/2007 | Slesinski | |
| 7,173,779 B2 * | 2/2007 | Shelef | 359/819 |
| 7,489,411 B2 | 2/2009 | Ashford | |
| 7,965,396 B2 | 6/2011 | Ashford | |
| 8,459,599 B2 * | 6/2013 | Du et al. | 248/181.1 |
| 2004/0065793 A1 * | 4/2004 | Shelef | 248/181.1 |
| 2005/0039977 A1 * | 2/2005 | Vu | 181/209 |

* cited by examiner

*Primary Examiner* — Amy J. Sterling

(57) ABSTRACT

A mounting apparatus for repeatable positioning of an item may include a first mount, a second mount, and a third mount. The first mount may be configured to receive a first member coupled to the item wherein the first mount may constrain the first member against movement along three mutually-orthogonal directions. The second mount may be configured to receive a second member coupled to the item and constrain the second member against movement along two of the directions. The third mount may be configured to receive a third member coupled to the item and constrain the third member against movement along one of the directions. The first, second, and third member may be at least partially-spherical and may be engaged to the respective first, second, and third mount.

13 Claims, 9 Drawing Sheets

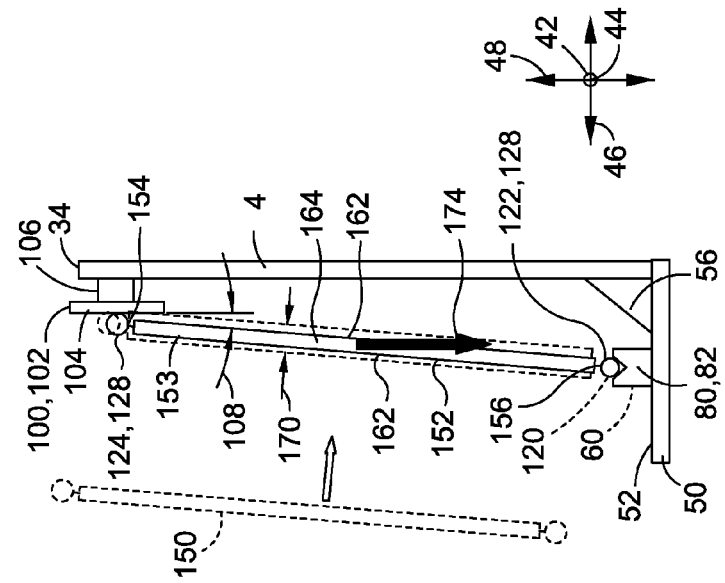
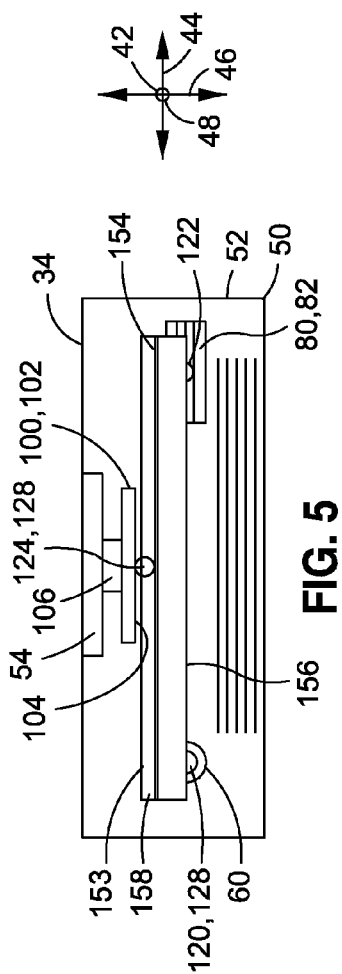
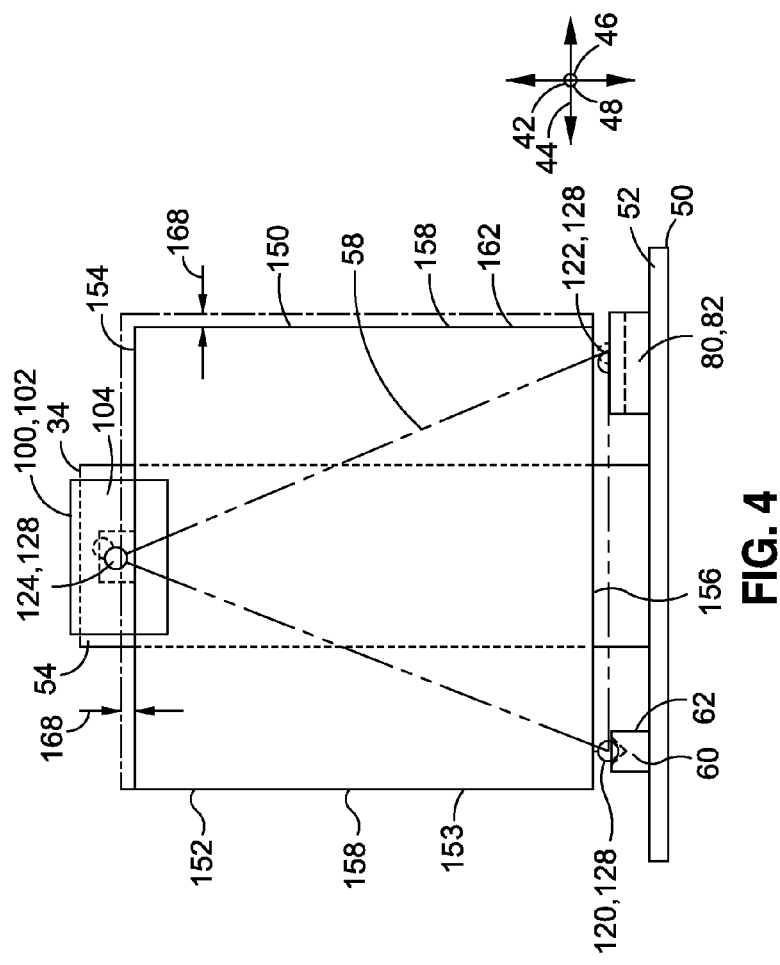

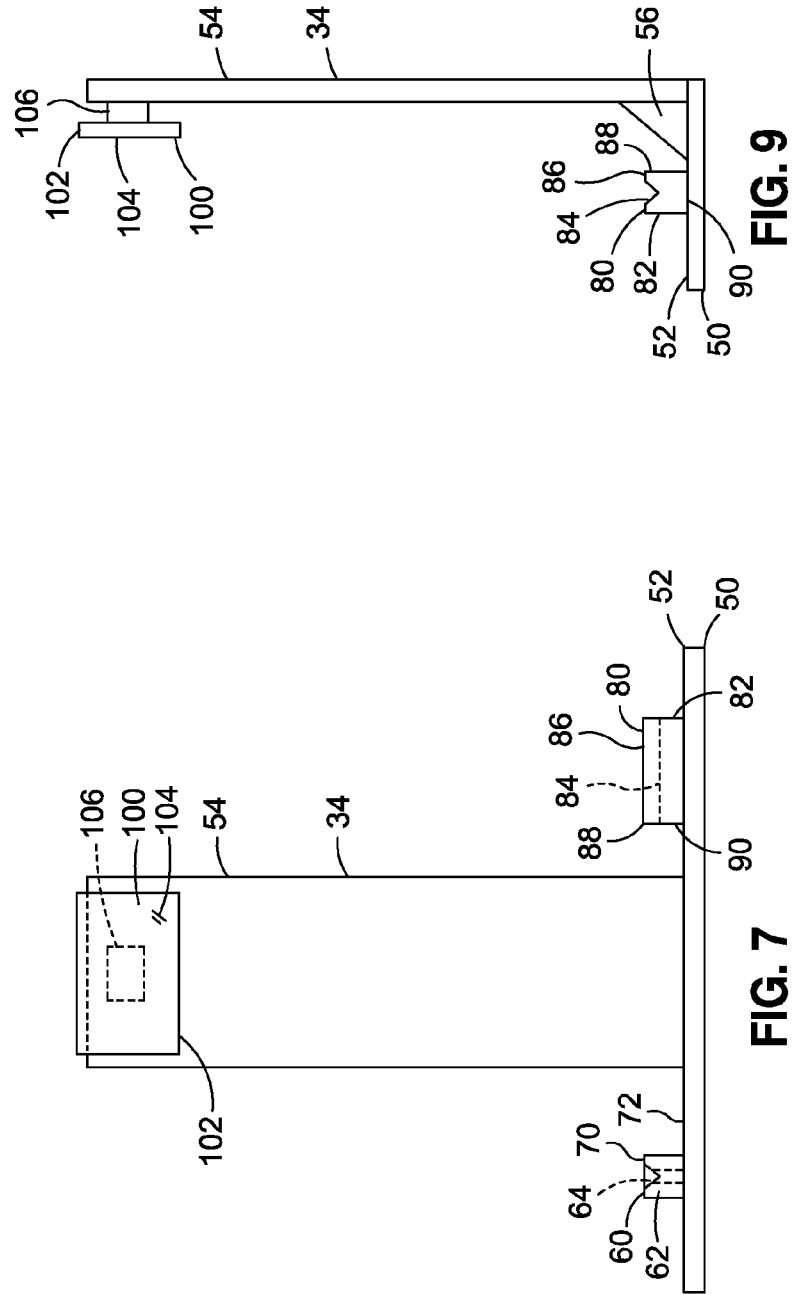

MOUNT FOR A CALIBRATION STANDARD

FIELD

The present disclosure relates generally to measurement systems and, more particularly, to a system and method for supporting or mounting an item such as a calibration standard for a laser projector.

BACKGROUND

Laser projectors are used in a variety of manufacturing operations. For example, laser projectors may be used for part placement in structural assemblies. In this regard, one or more laser projectors may be installed in a work zone and may emit a laser beam for projecting geometric patterns directly onto the surface of a structural assembly being assembled in an assembly jig. The geometric patterns projected by the laser beam may facilitate a relatively precise location of a component relative to other components of the structural assembly or relative to a frame of reference without the use of hard tooling.

The laser beam may be projected as a relatively narrow beam (e.g., 0.030 inch). The laser beam is preferably projected onto the surface of the structural assembly at a nominal positional accuracy. The positional accuracy with which the laser beam is projected is preferably less than the manufacturing tolerances of the structural assembly. For example, the laser projector may have a nominal positional accuracy of ±0.015 inch at a nominal distance of 15 feet to enable locating a component having a nominal locational tolerance on the structural assembly of ±0.030 inch.

Prior to operating a laser projector after a period of nonuse or at periodic intervals, it is necessary to verify that the positional accuracy of the laser projector is within the nominal tolerances. In this regard, the positional accuracy with which the laser beam is projected may be adversely affected by degradation or failure of internal components such as galvanometers of the laser projector. Conventional methods for verifying the positional accuracy of a laser projector include the use of a calibration pattern mounted to a structure. The laser beam is projected against the calibration pattern and measurements are recorded of the deviation of the laser beam relative to the calibration pattern.

It is generally desirable to calibrate the positional accuracy of the laser projector at various locations within a work zone containing the assembly jig. For example, it is generally desirable to calibrate the positional accuracy of a laser projector at opposite sides and at upper and lower sides of the assembly jig. It is also generally desirable to account for changes in the location and/or the size of the calibration pattern within the work zone due to changes in temperature which may cause the calibration pattern to expand or contract. In addition, once the laser projector is calibrated, it may be desirable to remove the calibration pattern from the work zone to avoid interference of the calibration pattern with manufacturing operations.

As can be seen, there exists a need in the art for a system and method for calibrating a laser projector in a manner that accounts for changes in the size and the relative location of the calibration pattern within the work zone due to changes in temperature of the manufacturing environment. In addition, there exists a need in the art for a system and method for calibrating a laser projector wherein the calibration pattern may be located at various positions within the work zone and/or such that the calibration may be entirely removed from the work zone to avoid interfering with manufacturing operations.

SUMMARY

The above-noted needs associated with calibration of laser projectors are specifically addressed by the present disclosure which provides a mounting apparatus for repeatable positioning of an item, such as a calibration standard, relative to the mounting apparatus. The mounting apparatus may include a fixture having a first mount, a second mount, and a third mount. The first mount may be configured to receive a first member that may be coupled to the item and which may constrain the first member against movement along three mutually-perpendicular directions. The second mount may be positioned in fixed relation to the first mount and may be configured to receive a second member. The second member may be coupled to the item and may constrain the second member against movement along two of the directions. The third mount may be positioned in fixed relation to the first and second mount. The third mount may be configured to receive a third member that may be fixedly coupled to the item and may constrain the third member against movement along one of the directions. The first, second, and third members may be engaged to the respective first, second, and third mounts in a manner such that the item (e.g., a calibration standard) is unrestrained against movement along three mutually-orthogonal directions. Advantageously, by allowing the calibration standard to move in an unrestrained manner along the three mutually-orthogonal directions as indicated above, distortion of a known measurement pattern (e.g., a calibration pattern) of the calibration standard may be prevented.

In a further embodiment, disclosed is a calibration system for a laser projector. The calibration system may include a calibration standard that may have at least three partially-spherical first, second, and third members mounted thereto. The calibration system may further include a mounting apparatus for repeatable positioning of the calibration standard. The mounting apparatus may include a fixture having a first mount, a second mount, and a third mount in fixed relation to one another and provided in a triangular pattern that may be complementary to the triangular pattern of the first, second, and third members.

The first mount may be configured to receive a first member that may be coupled to the item and which may constrain the first member against movement along three mutually-perpendicular directions. The second mount may be positioned in fixed relation to the first mount and may be configured to receive a second member. The second member may be coupled to the item and may constrain the second member against movement along two of the directions. The third mount may be positioned in fixed relation to the first and second mount. The third mount may be configured to receive a third member that may be fixedly coupled to the item and may constrain the third member against movement along one of the directions. The first, second, and third members may be engaged to the respective first, second, and third mounts in a manner such that the item is unrestrained against movement along three mutually-orthogonal directions. As indicated above, the unrestrained movement capability of the item such as a calibration standard may advantageously prevent distortion of a measurement pattern that may be provided on a face of the calibration standard.

Also disclosed is a method of supporting an item such as a calibration standard in a mounting apparatus. The method may include providing the item with first, second, and third members that are at least partially spherically-shaped. The method may further include engaging the first member in a first mount configured to constrain the first member against movement along three mutually-orthogonal directions. The method may additionally include engaging the second member in a second mount configured to constrain the second member against movement along exactly two of the directions. Furthermore, the method may include engaging the third member in a third mount configured to constrain the third member against movement along exactly one of the directions. Advantageously, the method may provide a means to support the item without constraining the item against movement such as thermal expansion or thermal contraction of the item that may occur due to a temperature change, or movement of the item due to droop, sag, or distortion of the item due to gravitational force acting on the mass of the item.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is a front view of an embodiment of a calibration standard having first, second, and third spherical members respectively mounted to a first, second, and third mount of the mounting apparatus in a manner such that the calibration standard is unrestrained against movement along three mutually-orthogonal directions;

FIG. 5 is a top view of the calibration standard and the mounting apparatus of FIG. 4;

FIG. 6 is a side view of the calibration standard and the mounting apparatus of FIG. 4;

FIG. 7 is a front view of a fixture for supporting the first, second, and third mount of the mounting apparatus;

FIG. 8 is a top view of the mounting apparatus of FIG. 7;

FIG. 9 is a side view of the mounting apparatus of FIG. 7

DETAILED DESCRIPTION

Figure 1:
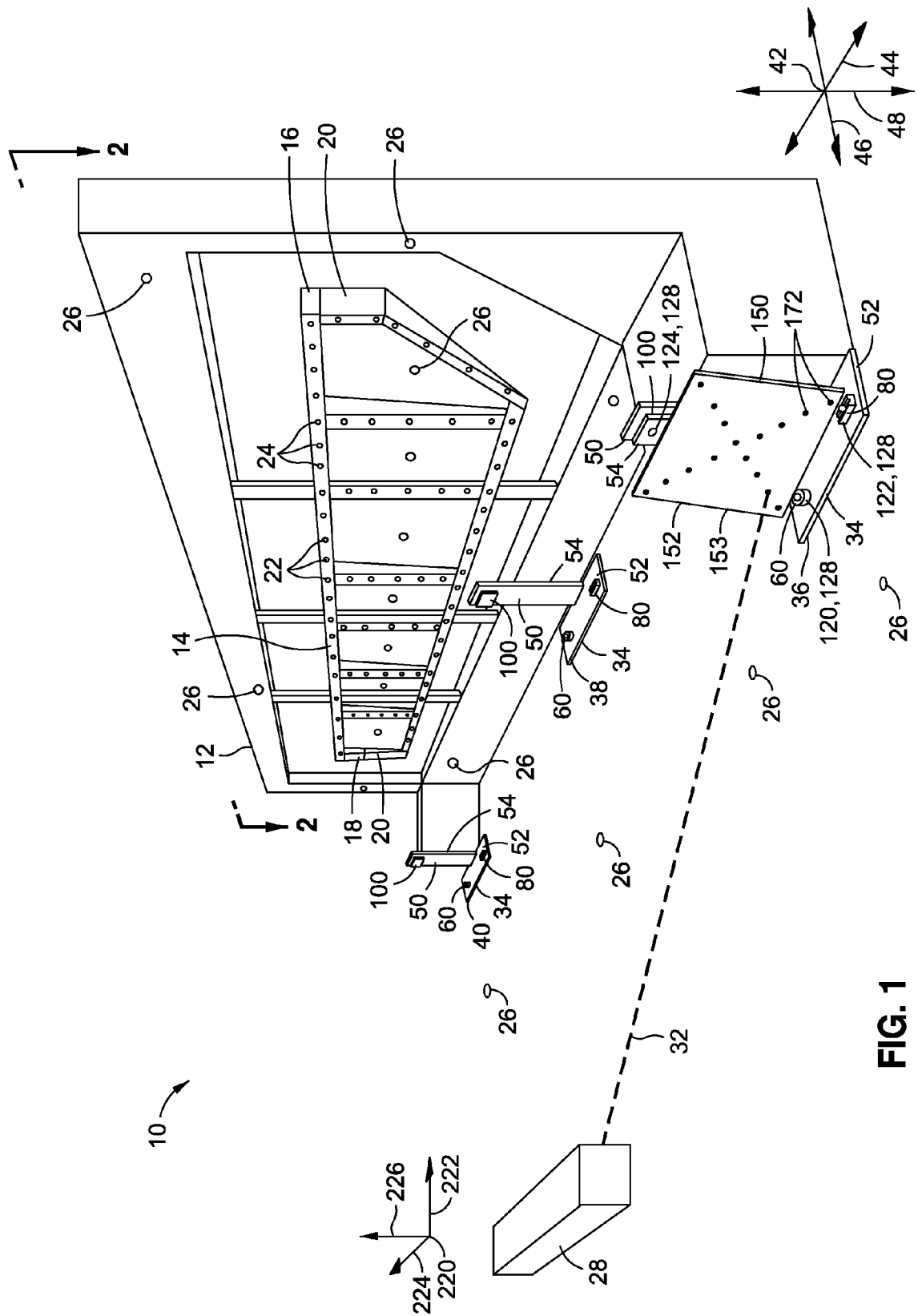
FIG. 1 is a perspective illustration of a laser projector and a structural assembly held in place by an assembly jig in a work zone and further illustrating a plurality of mounting apparatuses for mounting a calibration standard at several positions in the work zone.

Referring now to the drawings wherein the showings are for purposes of illustrating preferred and various embodiments of the disclosure, shown in FIG. 1 is an illustration of a work zone 10 including an assembly jig 12 as may be used for supporting a structure or an article 14. The work zone 10 may include one or more measurement devices such as one or more laser projectors 28 for emitting a laser beam 32 for positioning and/or locating components on the article 14, for locating hole patterns 24 on the article 14, or for other purposes.

Advantageously, the present disclosure includes a lightweight, portable calibration system which may include a mounting apparatus 34 for supporting a calibration standard 150 for on-site calibration of a laser projector 28 in one or more work zones 10. The mounting apparatus 34 may be mounted at one or more positions in a work zone 10 so that the laser projector 28 may be calibrated at the different positions in the work zone 10. The mounting apparatus 34 may be configured to allow for repeatable mounting of the calibration standard 150 on the mounting apparatus 34 at the different positions such as at the first, second, and third positions 36, 38, 40 shown in FIG. 1.

Advantageously, the calibration standard 150 may be of simple construction and may be configured to be relatively lightweight to allow for manual repositioning of the calibration standard 150 into one or more mounting apparatuses 34 at different positions within the work zone 10. The mounting apparatus 34 at each position within the work zone 10 may be configured to allow for unconstrained movement of the calibration standard 150. The movement of the calibration standard 150 is unconstrained in the sense that the calibration standard 150 is generally non-movable relative to one point (e.g., the first mount 60) on the mounting apparatus 34 and allowing for temperature-induced expansion or contraction of the calibration standard 150 in any direction. Such temperature-induced variations in the calibration standard 150 may comprise in-plane thermal expansion and/or out-of-plane thermal expansion or contraction of the calibration standard 150. Such thermal expansion or contraction may be caused by changes in ambient temperature in the work zone 10 and which may otherwise result in distortion of the calibration standard 150 if the calibration standard were restrained against movement.

In FIG. 1, the article 14 may be mounted to the assembly jig 12 during manufacturing operations or during other operations (e.g., testing) that may be conducted in association with the article 14. The article 14 may comprise a single work piece that may be supported by the assembly jig 12 or the article 14 may comprise an assembly of work pieces that may be supported by the assembly jig 12. In this regard, the article 14 may comprise any assembly, subassembly, system, subsystem, device, or any other element, without limitation, that may advantageously incorporate the use of a mounting apparatus 34 and/or calibration system as disclosed herein. The laser projector 28 may emit a laser beam 32 that may be rapidly and repetitively scanned or steered in a predetermined manner such that the laser beam 32 appears on the article 14 surface or on the assembly jig 12 as a geometric element or shape such as a line, an arc, a set of lines, a set of cross-hairs, or other geometric elements. In this manner, the laser projector 28 may be used to locate one or more work pieces on the article 14 or relative to the article 14. The laser projector 28 may also be used to locate holes 22 or hole patterns 24 or other features on the article 14, or assist in any one of a variety of other manufacturing or testing operations, and/or other operations of any type, without limitation.

The assembly jig 12 may include upper and lower sides and lateral sides and which may define a portion of the boundary of the work zone 10 wherein calibration of the laser projector 28 may be desired. A plurality of tool alignment targets or jig targets 26 may be mounted to or located on the jig assembly. Such jig targets 26 may facilitate the alignment of the laser projector 28 with the assembly jig 12 relative to a reference coordinate system 220 of the work zone 10. The reference coordinate system 220 may have an x-axis 222, a y-axis 224, and a z-axis 226. Jig targets 26 may also be mounted to the article 14 such as on the article 14 edges 20 at first and second ends 16, 18 of the article 14 and at various other locations on the article 14 including at locations between the edges 20 of the article 14. Jig targets 26 may additionally be mounted to other areas of the work zone 10 such as on floors, walls, and/or ceilings of the work zone 10. By locating jig targets 26 at different locations within the work zone 10, the laser projector 28 may be aligned with the assembly jig 12, the article 14, and at a variety of locations in the work zone 10.

FIG. 1 additionally shows a plurality of mounting apparatuses 34 located at predetermined positions in the work zone 10. For example, FIG. 1 illustrates a mounting apparatus 34 located at a first position 36 at one end of the assembly jig 12, at a second position 38 at an approximate mid-point of the assembly jig 12, and at a third position 40 at one end of the assembly jig 12. Although three mounting apparatuses 34 are shown in the work zone 10, any number of mounting apparatuses 34 may be provided and may be installed at any position in the work zone 10 including on the jig assembly or on other locations in the work zone 10. The mounting apparatuses 34 may be either permanently mounted in the work zone 10 or removably mounted in the work zone 10. For example, the mounting apparatuses 34 may be either permanently coupled or removably coupled to the floor of the work zone 10 adjacent the assembly jig 12 or to other structure in the work zone 10 including the article 14 supported by the assembly jig 12. The mounting apparatuses 34 may also be permanently coupled or removably coupled to other areas of the work zone 10 including the ceiling (not shown), the walls (not shown) of the work zone 10, nearby structure, or any other locations in the work zone 10 to enable calibration of the laser projector 28 over a representative volume of the work zone 10.

In FIG. 1, each mounting apparatus 34 may include a first mount 60, a second mount 80, and a third mount 100. The first mount 60, the second mount 80, and the third mount 100 may be mounted in fixed position relative to one another. For example, the first mount 60, the second mount 80, and the third mount 100 may be fixedly coupled to a fixture 50 described in greater detail below. Alternatively, the first mount 60, the second mount 80, and the third mount 100 may be mounted as individual elements to structure in the work zone 10 such as on the assembly jig 12, on the floor, the walls, or the ceiling of the work zone 10, or on any other structure in the work zone 10. In this regard, a plurality of substantially similar mounting apparatuses 34 may be located at any position in the work zone 10 where calibration of the laser projector 28 is desired.

Each mounting apparatus 34 may be configured to support an item 152 such as a calibration standard 150. In an embodiment, the calibration standard 150 may be configured as a relatively lightweight, generally planar panel member 153 upon which one or more measurement targets 172 (not shown) and/or measurement patterns (not shown) may be mounted. The measurement targets 172 may facilitate a determination of the accuracy of the laser beam 32 projected by the laser projector 28 such as the positional accuracy of the laser beam 32. In this regard, the measurement targets 172 may facilitate a determination as to whether the laser projector 28 is projecting the laser beam 32 at a specified positional accuracy for a given projection distance. For example, the laser projector 28 may be specified by the manufacturer as being capable of projecting the laser beam 32 at a nominal positional accuracy (e.g., ±0.020 inch) at a given distance (e.g., 20 feet) between the laser projector 28 and a measurement target. However, the measurement targets 172 may also facilitate a determination of the accuracy of the laser beam 32 width. For example, the measurement targets 172 may facilitate a determination regarding whether the laser beam 32 is being projected at a specified nominal beam width (e.g., ±0.015) at a given distance (e.g., 20 feet).

In FIG. 1, the mounting apparatus 34 may advantageously provide a convenient means for positively positioning the calibration standard 150 at multiple positions in a work zone 10 such as on or adjacent to an assembly jig 12 for checking the accuracy of a laser projector 28 or other measurement device. In this regard, the mounting apparatus 34 advantageously allows for unrestrained movement of a calibration standard 150 when mounted to the mounting apparatus 34 such that the calibration standard 150 may be repeatedly positioned in the mounting apparatus 34. For example, the mounting apparatus 34 may facilitate movement (e.g., in-plane and/or out-of-plane expansion or contraction) of the calibration standard 150 in the horizontal direction 44, the forward-aft direction 46, and/or the vertical direction 48 as indicated by the mount reference system 42 and as described in greater detail below.

The unrestrained movement of the calibration standard 150 when mounted in the mounting apparatus 34 advantageously results in negligible or zero warping, bowing, twisting, or other distortion of the calibration standard 150 in response to thermal expansion or contraction of the calibration standard 150 due to changes in temperature of the calibration standard 150. By allowing for unrestrained movement of the calibration standard 150, distortion of an arrangement of measurement targets 172 on the calibration standard 150 or distortion of a measurement pattern (FIGS. 17-20) on the calibration standard 150 may be minimized. By minimizing distortion of the measurement targets 172 and/or measurement pattern, the accuracy of calibrating the laser projector 28 may be increased. In addition, the mounting apparatus 34 disclosed herein provides a convenient and lightweight means for repeatable positioning of the calibration standard 150 at multiple positions in one or more work zones 10 for convenient on-site calibration of one or more laser projectors 28.

Figure 2:
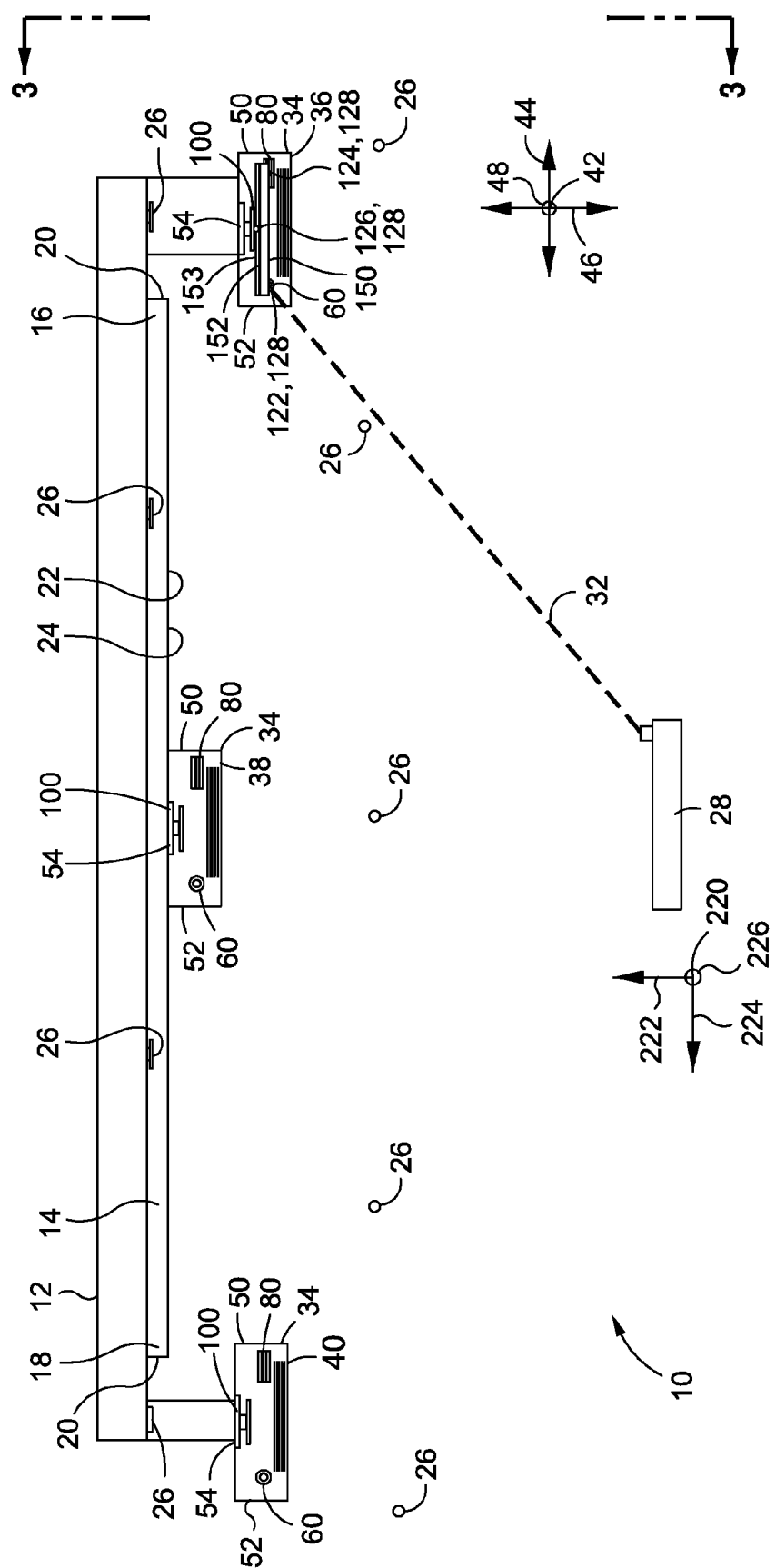
FIG. 2 is a top view of the work zone and illustrating the relative position of the laser projector and the positions of the mounting apparatuses for the calibration standard.

In FIG. 2, shown is a top view of the work zone 10 of FIG. 1. The laser projector 28 is shown projecting a laser beam 32 toward a calibration standard 150 mounted in the mounting apparatus 34 at the first position 36. During alignment of the laser projector 28 to the assembly jig 12 in a method 300 (FIG. 21) described below, a user may calibrate the laser projector 28 by first installing the calibration standard 150 in the mounting apparatus 34 at one of the positions (e.g., at the first position 36), measuring the location of one or more measurement targets 172 on the calibration standard 150 using a high-accuracy measurement system (e.g., a photogrammetry system—not shown), temporarily removing the calibration standard 150 from the mounting apparatus 34, and then re-installing the calibration standard 150 in the mounting apparatus 34 at the same position (e.g., at the first position 36) to verify the repeatability of the location of the measurement targets 172 at the first position 36. The user may repeat the installation, measurement check, and removal of the calibration standard 150 multiple times to establish the repeatability of the location of the measurement standard 150 at the given position. Repeatability of the measurements of the location of the measurement targets 172 may be indicative of the integrity of the internal components of the laser projector 28 such as the galvanometers of the laser projector 28. After establishing the repeatability of the measurement target 172 locations when the calibration standard 150 is in the first position 36, the user may perform a calibration of the laser projector 28 at the first position 36 by projecting test circles (not shown) and/or measurement patterns 200 (FIGS. 17-20) onto the calibration standard 150 as described below.

Figure 3:
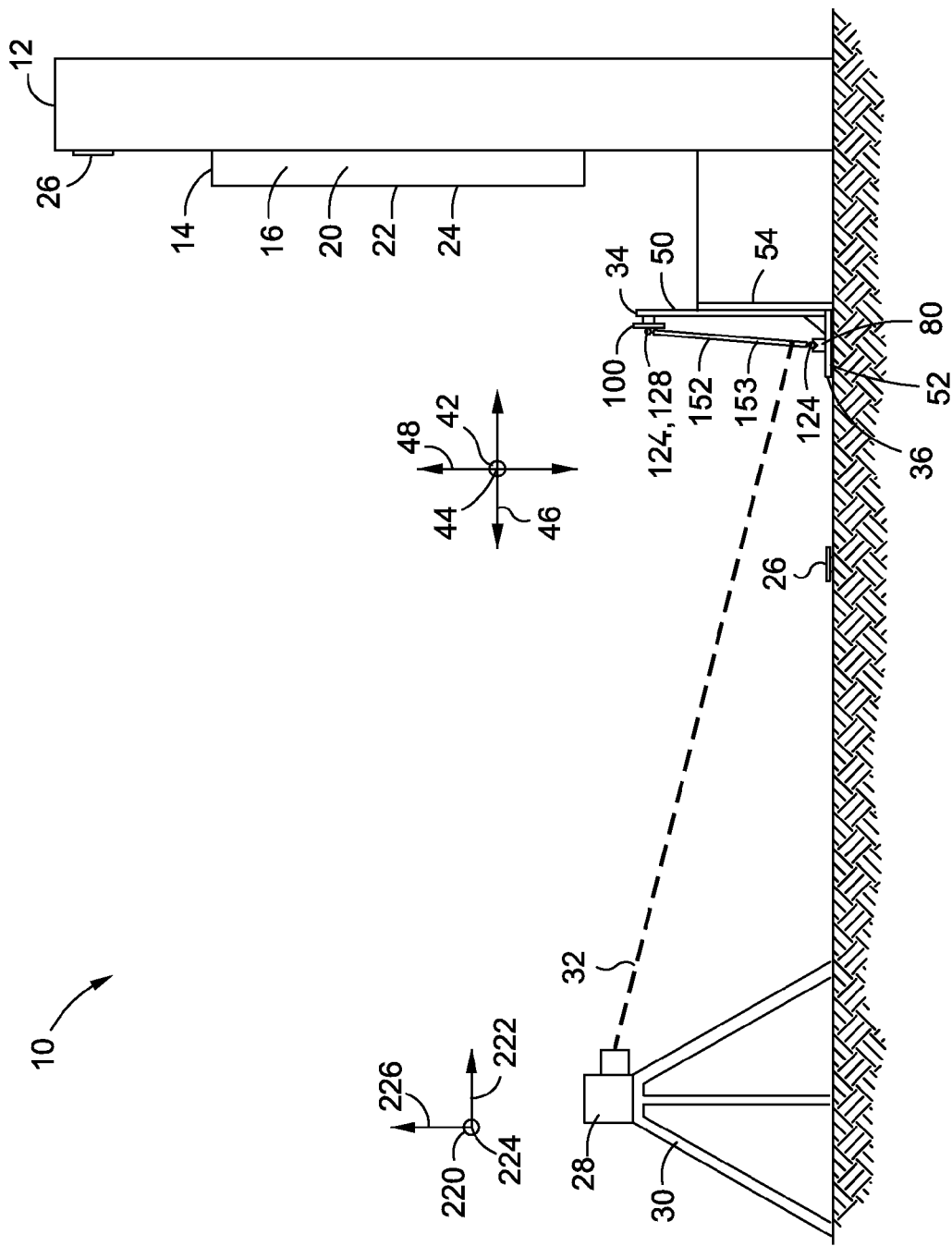
FIG. 3 is a side view of the work zone and illustrating one of the mounting apparatuses having a calibration standard mounted thereto.

FIG. 3 is a side view of the work zone 10 illustrating an embodiment of the mounting apparatus 34 and calibration standard 150 located in the first position 36. The laser projector 28 is shown mounted on a fixed support 30 which is preferably non-movable relative to the assembly jig 12. In this regard, the laser projector 28 may be permanently mounted at a fixed location in the work zone 10 such as to a permanent, non-movable structure such as to the assembly jig 12, the floor, the ceiling, and/or the walls of the work zone 10, and/or to other structure (not shown) that may be in the work zone 10. Mounting of the laser projector 28 on a permanent structure in the work zone 10 may reduce the possibility of disrupting the alignment or the calibration of the laser projector 28 as a result of being bumped into by personnel or equipment.

FIGS. 4-6 are front, top, and side views of the mounting apparatus 34 supporting a calibration standard 150. The mounting apparatus 34 includes the first mount 60, the second mount 80, and the third mount 100 which are fixedly coupled to the fixture 50. The first mount 60, the second mount 80, and the third mount 100 are configured to receive, engage, or support a respective first member 120, second member 122, and third member 124 such that such that the calibration standard 150 is unrestrained against movement due to in-plane expansion 168 or contraction or out-of-plane expansion 170 or contraction of the calibration standard 150. The first member 120, the second member 122, and the third member 124 may be fixedly coupled to the calibration standard 150 and arranged in a triangular pattern 58 for supporting the calibration standard 150 on the mounting apparatus 34.

In FIG. 4, the first mount 60 and the second mount 80 may be located inwardly from the side edges 158 of the calibration standard 150. For example, in an embodiment, the first mount 60 and the second mount 80 may be located approximately at the airy points (not shown) of the mounting apparatus 34. Each airy point may be located a distance inboard from the side edge 158 of approximately 22 percent of the length of the bottom edge 156 of the calibration standard 150. In such locations, sag or droop along the bottom edge 156 may be minimized on opposite sides of each one of the first and second mounts 60, 80 as the mass of the calibration standard 150 is distributed and comes to equilibrium when the calibration standard 150 is initially installed on the first and second mount 60, 80. By locating the first and second mounts 60, 80 inboard of the side edges 158 of the calibration standard 150 (e.g., at the airy points), distortion in the face containing the measurement targets 172 (FIGS. 17-20) or patterns 200 (FIGS. 17-20) of the calibration standard 150 may be minimized. However, the first mount 60 and the second mount 80 may be positioned at any location along the bottom edge 156 of the calibration standard 150 including at the extreme ends or corners of the calibration standard 150.

Figure 10:
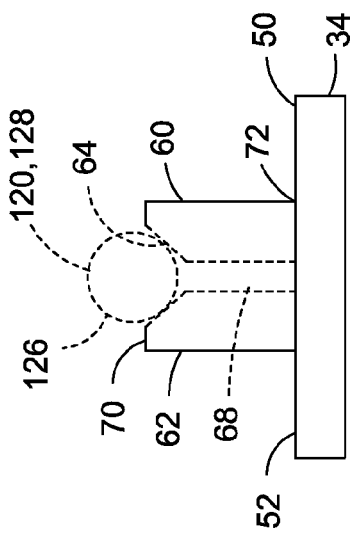
FIG. 10 is a front view of the first mount configured as a conical mount for supporting a spherical member.

The first member 120, the second member 122, and the third member 124 may be at least partially-spherically-shaped 126 (e.g., hemispherical) (FIG. 10). In an embodiment, each one of the first member 120, the second member 122, and/or the third member 124 may be provided as a sphere 128. The spheres 128 of the first, second, and third members 120, 122, 124 may be provided in the same size such that standard-sized first, second, and third members 120, 122, 124 may be mounted to correspondingly-sized first, second, and third mounts 60, 80, 100 of one or more mounting apparatus 34 in one or more work zones 10. In an embodiment, each one of the spheres 128 may be provided in a diameter in the range of from approximately 0.10 inch to 3 inches although the first member 120, the second member 122, and the third member 124 may be provided in any size, shape, and configuration, without limitation.

In an embodiment, the first member 120, the second member 122, and the third member 124 may be formed of metallic material such as aluminum, steel, or other alloy. However, the first member 120, the second member 122, and the third member 124 may be formed of non-metallic material (e.g., ceramic material) or a combination of metallic and non-metallic material. The material for the first, second, and third members 120, 122, 124 preferably has a relatively low coefficient of thermal expansion to minimize movement of the calibration standard 150 such as in-plane expansion 168 or out-of-plane expansion 170 due to a change in temperature of the calibration standard 150. In an embodiment, the first, second, and third members 120, 122, 124 may be formed of substantially the same material having substantially similar coefficients of thermal expansion such that a change in ambient temperature results in a substantially uniform change in the size of the first, second, and third members 120, 122, 124. The first member 120, the second member 122, and/or the third member 124 may be fixedly coupled to the calibration standard 150 in a manner described in greater detail below.

The calibration standard 150 may comprise a generally planar structure or panel member 153 which may be generally orthogonally-shaped (e.g., square-shaped, rectangularly-shaped) although other shapes are contemplated. As described in greater detail below, the panel member 153 may be formed as a sandwich structure 160 including a pair of metallic and/or non-metallic face sheets 162 (FIG. 16) separated by a core 164 (FIG. 16) material. In an embodiment, the face sheets 162 may be formed of aluminum and may optionally be coated with carbon fiber to increase the stiffness of the calibration standard 150. The core 164 material may comprise a corrugated structure such as corrugated aluminum or other corrugated material. The core 164 may also include metallic or non-metallic ribs (not shown). In a further embodiment, the core 164 may comprise honeycomb aluminum core or other metallic or non-metallic honeycomb core material 165.

Alternatively, the core 164 material may comprise foam core or other core 164 material to provide a relatively lightweight and stiff structure that may facilitate transporting the calibration standard 150 to different work zones 10 for on-site calibration of laser projectors 28 or other measurement devices. A sandwich construction for the calibration standard 150 advantageously also minimizes sag, droop, bowing, warping, twisting, or other distortion of the calibration standard 150 that may otherwise occur due to gravitational force 174 acting on the mass of a calibration standard or due to changes in temperature of the work zone 10 and/or of the calibration standard 150. However, the calibration standard 150 may be formed in alternative construction configurations and is not limited to a sandwich construction. For example, the calibration standard 150 may be formed of a semi-monocoque construction, as a homogeneous plate, or in any one of a variety of alternative construction configurations.

In FIGS. 4-6, the calibration standard 150 may be provided with a height in the range of from approximately 1 foot to 10 feet and a width in the range of from approximately 1 foot to 10 feet although the calibration standard 150 may be provided in a height and width that is larger or smaller than the 1 to 10 foot range. In an embodiment, the calibration standard 150 may be provided in a height and width of approximately 3-5 feet (height) by 3-5 feet (width) such as approximately 4 feet by 4 feet. The thickness of the calibration standard 150 may be defined by the spacing of the face sheets 162 (FIG. 16) with a proportionally greater thickness for larger lengths and widths of the calibration standard 150. In an embodiment, the calibration standard 150 may be provided in a thickness of approximately 0.1 to 1.5 inch. In an embodiment the calibration standard 150 may be provided in a thickness of approximately 0.5 inch although the calibration standard 150 may be provided in any thickness, without limitation. The thickness of the calibration standard 150 may be such that the calibration standard 150 is relatively resistant to out-of-plane flexing or bending.

In FIG. 4, the first mount 60 may be configured as a conical mount 62 for supporting the first member 120 shown as a sphere 128. The first mount 60 may constrain the first member 120 against movement along three mutually-orthogonal directions comprising the horizontal direction 44, the forward-aft direction 46, and the vertical direction 48 represented by the mount reference system 42. The first mount may be formed of a metallic material such as tool steel, or any other metallic or non-metallic material, without limitation. In an embodiment, the first mount 60 may be formed of material that has a relatively low coefficient of thermal expansion. The first mount 60 may be formed of the substantially similar material from which the fixture 50 is formed which may be substantially similar to the material from which the second mount 80 and the third mount 100 may be formed. However, the first mount 60, the second mount 80, the third mount 100 and the fixture 50 may be formed of different materials.

In FIGS. 4-6, the second mount 80 may be configured as a V-block 82 which may be positioned in fixed relation to the first mount 60. For example, the first and second mount 60, 80 may be fixedly coupled to the base member of the fixture 50. The second mount 80 may be formed of a metallic material which may be the same material from which the first mount 60 and the third mount 100 are formed such that the first mount 60, the second mount 80, and the third mount 100 have the same coefficients of thermal expansion. The second mount 80 may be configured to receive the second member 122. As indicated above, the second member 122 may have a shape that is at least partially-spherical. For example, the second member 122 may be configured as a metallic sphere 128 similar to the sphere 128 of the first member 120. The second member 122 may be fixedly coupled to the calibration standard 150. The second mount 80 may be configured to constrain the second member 122 against movement along two of the mutually-orthogonal directions. More particularly, the second mount 80 may constrain the second member 122 against movement along the forward-aft direction 46 of the mount reference system 42 shown in FIG. 6. The second mount 80 may allow the second member 122 to move in an unrestrained manner along the horizontal direction 44 and the vertical direction 48 of the mount reference system 42.

The third mount 100 may be configured as an at least partially-planar surface such as a planar surface 104 of a plate member 102. The third mount 100 may be located above the first and second mount 60, 80 and may be oriented in a vertical arrangement such that the third member 124 may be placed in abutting contact with the planar surface 104 when the calibration standard 150 is installed in the fixture 50. As shown in FIG. 6, the third member 124 may be fixedly coupled to the calibration standard 150. The third mount 100 may constrain the third member 124 against movement along one of the mutually-orthogonal directions. More particularly, the third mount 100 may constrain the third member 124 against movement along the forward-aft direction 46 of the mount reference system 42 shown in FIG. 6. The third mount 100 may allow the third member 124 to move in an unrestrained manner along the horizontal direction 44 and the vertical direction 48 of the mount reference system 42.

In FIG. 6, the first, second, and third members 120, 122, 124 may be positioned relative to one another such that the calibration standard 150, when mounted to the mounting apparatus, is oriented at a mounting angle 108 of less than approximately 10 degrees relative to the vertical direction 48 although the mounting angle 108 may be greater than approximately 10 degrees. By configuring the fixture 50 such that the calibration standard 150 is oriented at an angle 108 relative to the vertical direction 48, gravitational force 174 acting on the mass of the calibration standard 150 may positively position the calibration standard 150 in the fixture 50.

The arrangement of the first, second, and third mounts 60, 80, 100 in the triangular pattern 58 shown in FIG. 4 provides for 3-point placement of the calibration standard 150 that is repeatable due to the first member 120 being constrained in the first mount 60 along three mutually-orthogonal directions, namely, the horizontal direction 44, the forward-aft direction 46, and the vertical direction 48. The second member 122 is constrained by the second mount 80 along two of the mutually-orthogonal directions, namely, the forward-aft direction 46 and the vertical direction 48, and is unrestrained along the horizontal direction 44. The third member 124 is constrained by the third mount 100 in one of the mutually-orthogonal directions, namely, the forward-aft direction 46, and is unrestrained along the horizontal direction 44 and the vertical direction 48 such that there is no conflict with the directions that are constrained by the first and second mount 60, 80. Advantageously, the mounting apparatus 34 accommodates in-plane and out-of-plane movement of the calibration standard 150. For example, FIG. 4 illustrates in-plane expansion 168 of the calibration standard 150 generally along the horizontal direction 44 and a vertical direction 48. FIG. 6 illustrates out-of-plane expansion 170 of the calibration standard 150 generally along the forward-aft direction 46

FIGS. 7-9 illustrate an embodiment of the mounting apparatus 34 including a fixture 50 and the first mount 60, the second mount 80, and the third mount 100 fixedly coupled to the fixture 50. The fixture 50 may include a base portion 52 and a vertical member 54 extending upwardly from the base portion 52. The base portion 52 may be formed as a plate or in other configurations supporting the first mount 60 and the second mount 80 in fixed relation to one another. The vertical member 54 may likewise be formed as a plate or in other configurations for rigidly supporting the third mount 100 in fixed position relative to the first mount 60 and the second mount 80. The third mount 100 may be coupled to an upper end of the vertical member 54 by means of a connector 106 as shown in FIG. 8 although the plate member may be omitted and the upper end of the vertical member may be configured as the third mount 100. The plate member 102 may be sized and positioned such that the calibration standard 150 is mounted at a mounting angle 108 relative to vertical as shown in FIG. 6 and described above.

In FIG. 9, the fixture 50 may optionally include one or more braces 56 for fixedly coupling the base portion 52 to the vertical member 54. In an embodiment, the fixture 50 may be formed of material that is substantially similar to the material of the first mount 60, the second mount 80, and the third mount 100 such that the fixture 50 and the mounts have substantially similar coefficients of thermal expansion. Although the base portion 52 and the vertical member 54 are shown as being formed as elongated, relatively planar members, the fixture 50 may be provided in any arrangement, without limitation, and is not limited to being formed of elongated, planar members. For example, the fixture 50 may be fabricated as a truss structure (not shown) such that the third mount 100 is substantially non-movable or fixed relative to the first mount 60 and the second mount 80.

Figure 11:
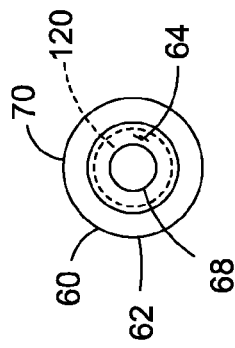
FIG. 11 is a top view of the conical mount of FIG. 10.

In FIGS. 10-11, shown is the first mount 60 configured as a conical mount 62 having an upper end 70 and a lower end 72. The lower end 72 may be fixedly coupled to the base portion 52. A conical surface 64 may be formed in the upper end 70 for supporting the first member 120 which is shown as a sphere 128. The conical surface 64 may be provided at any angle such that the spherical surface of the first member 120 engages the conical surface 64 in a manner constraining the first member 120 against movement. A bore 68 may be formed through the first mount 60 for minimizing the mass of the fixture 50. The first mount 60 is not limited to being formed as a conical mount 62 but may be formed in any configuration providing at least three points (not shown) for non-movably supporting the first member 120. In this regard, the first mount 60 may be configured in any embodiment for constraining the first member 120 against movement along the three mutually-orthogonal directions of the mount reference system 42 as described above.

Figure 14:
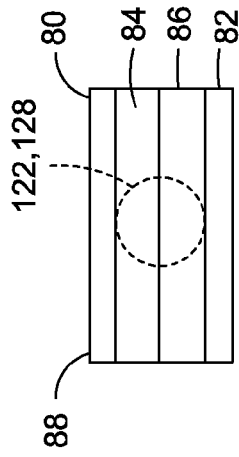
FIG. 14 is a top view of the V-block of FIG. 12.
Figure 12:
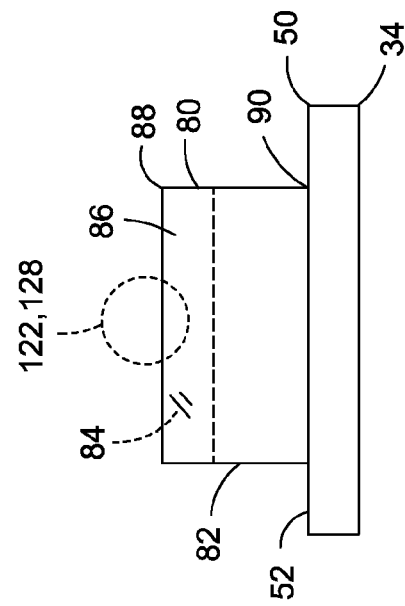
FIG. 12 is a front view of the second mount configured as a V-block.
Figure 13:
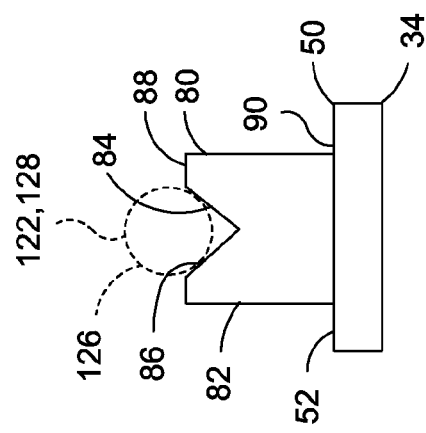
FIG. 13 is a side view of the V-block of FIG. 12.

In FIGS. 12 to 14, shown is the second mount 80 which may be configured as a V-block 82 having an upper end 88 and a lower end 90. The lower end 90 of the second mount 80 may be fixedly coupled to the base portion 52 in a manner similar to the first mount 60. The upper end 88 may include a V-groove 86 having angled surfaces 84 for receiving the second member 122 which is shown as a sphere 128. The V-groove 86 may be oriented in substantially parallel arrangement to a plane (not shown) that may be defined by the first member 120, the second member 122, and the third member 124 (FIG. 4). In this manner, the second member 122 may move unconstrained along the horizontal direction 44 (FIG. 4). It should be noted that the second mount 80 is not limited to a V-block 82 configuration but may be provided in any configuration that allows for unconstrained movement along the horizontal direction 44 while constraining movement along the forward-aft direction 46 and the vertical direction 48 (FIG. 4). For example, the second mount 80 may comprise any configuration having substantially parallel horizontally-oriented edges, wires, rods, for supporting the spherically shaped second member 122 and is not limited to the V-block 82 configuration shown in FIGS. 12-14.

Figure 16:
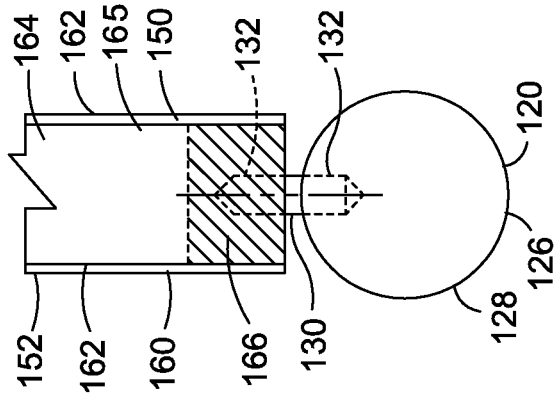
FIG. 16 is a side view of the spherical member mounted to the calibration standard.
Figure 15:
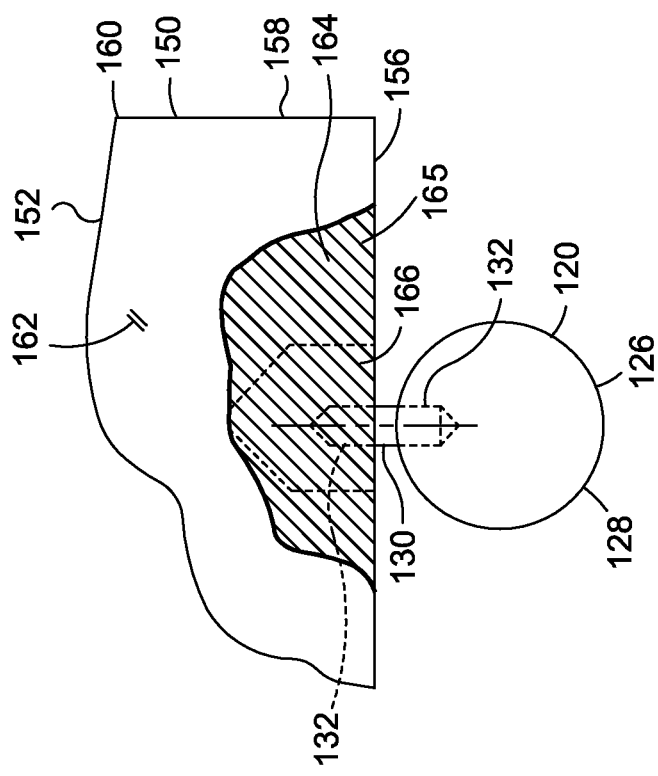
FIG. 15 is a front view of a portion of the calibration standard illustrating the mounting of a spherical member thereto.

FIGS. 15-16 illustrate the fixed coupling of the first member 120 to the calibration standard 150. The second member 122 and the third member 124 may be coupled to the calibration standard 150 in a manner similar to the first member 120. In the embodiment shown, the first member 120 may comprise a sphere 128. The sphere 128 may include a threaded bore 132 for receiving a threaded rod 130. The threaded rod 130 may extend outwardly from a top edge 154 (FIG. 4) or from a bottom edge 156 (FIG. 4) of the calibration standard 150. The threaded rod 130 may extend into a threaded bore 132 which may be formed in the side edge 158 of the calibration standard 150. Rigid material such as metallic material or potting compound 166 may be locally installed along the core 164 material (not shown) of the side edge 158 of the calibration standard 150 such that the threaded rod 130 may be engaged into the side edge 158. One or more jam nuts (not shown) may be rotatably secured on the threaded rod 130 to prevent rotation of the threaded rod 130 relative to the calibration standard 150 and relative to the sphere 128. It should be noted that the embodiment shown in FIGS. 15-16 is not to be construed as limiting alternative arrangements for fixed coupling of the first member 120, the second member 122, and the third member 124 to the calibration standard 150. In this regard, the present disclosure includes a wide variety of configurations for fixedly coupling the first, second, and third members 120, 122, 124 (FIG. 4) to the calibration standard 150.

Figure 17:
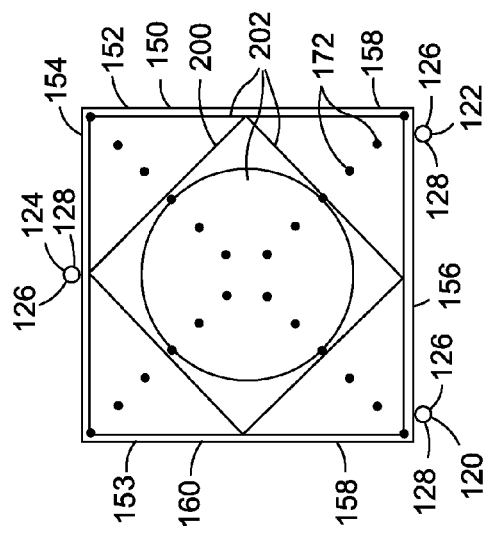
FIG. 17 is a front view of the calibration standard having a circle-diamond-square pattern projected onto the calibration standard by a laser projector.

FIG. 17 illustrates an embodiment of the calibration standard 150 having a plurality of measurement targets 172 and a measurement pattern 200 in the form of a circle-diamond-square 202 applied to the calibration standard 150 for checking the accuracy of a laser projector 28 and/or calibrating a laser projector 28 (FIG. 1). In a non-limiting embodiment, the measurement targets 172 may comprise retro-reflective targets (not shown) configured to facilitate visual inspection of the accuracy of the laser beam 32 (FIG. 1) in a known manner. The circle-diamond-square 202 may provide a means for performing a functional check of the oscillating galvanometers (not shown) of the laser projector 28 as known in the art. For example, the accuracy with which the laser beam 32 generates the corners of the diamond and square pattern may provide an indication of the functionality of the galvanometers.

Figure 18:
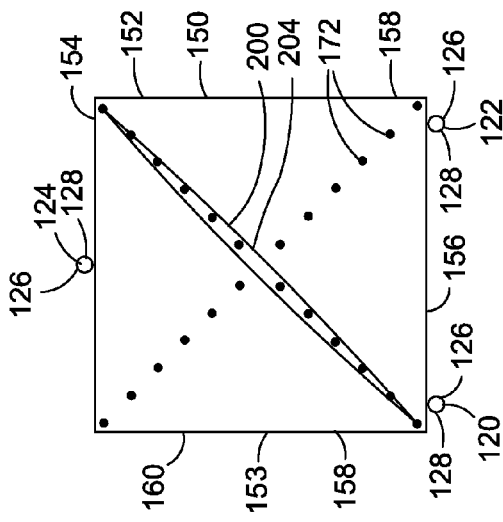
FIG. 18 is a front view of the calibration standard having a retrace pattern projected onto the calibration standard by a laser projector.

FIG. 18 illustrates an embodiment of the calibration standard 150 having a plurality of measurement targets 172 and a measurement pattern 200 in the form of a retrace 204 pattern. The retrace 204 pattern provides a means for checking the accuracy with which the laser projector 28 (FIG. 1) generates a line between two points. Bowing or spacing between the lines as shown in FIG. 18 may be representative of a lack of positional accuracy of the laser projector 28. A single line between two points may represent that the laser projector 28 is projecting the laser beam 32 within specified tolerances for positional accuracy as known in the art.

Figure 20:
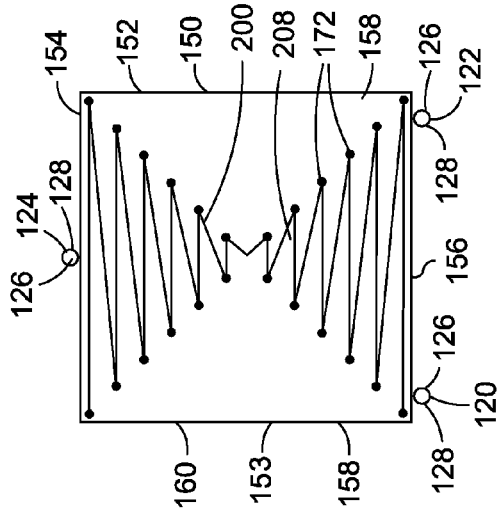
FIG. 20 is a front view of the calibration standard having horizontal spikes projected onto the calibration standard by a laser projector.
Figure 19:
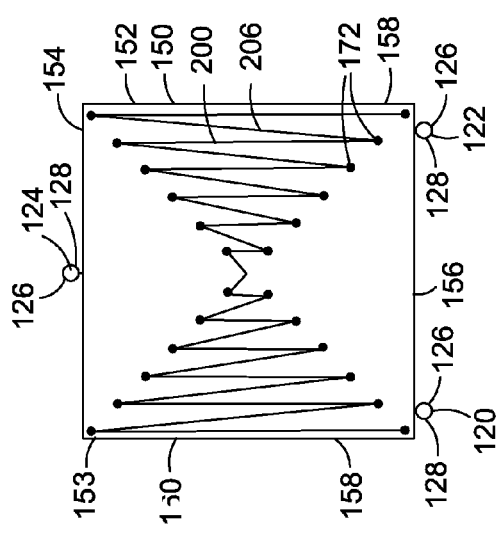
FIG. 19 is a front view of the calibration standard having vertical spikes projected onto the calibration standard by a laser projector.

FIGS. 19-20 illustrates an embodiment of the calibration standard 150 having a plurality of measurement targets 172 and a measurement pattern 200 in the form of vertical spikes 206 (FIG. 19) or horizontal spikes 208 (FIG. 20). The vertical spikes 206 provide a means to check the accuracy of the laser projector 28 (FIG. 1) in the horizontal direction 44 (FIG. 4). The horizontal spikes 208 provide a means to check the accuracy of the laser projector 28 in the vertical direction 48.

Figure 21:
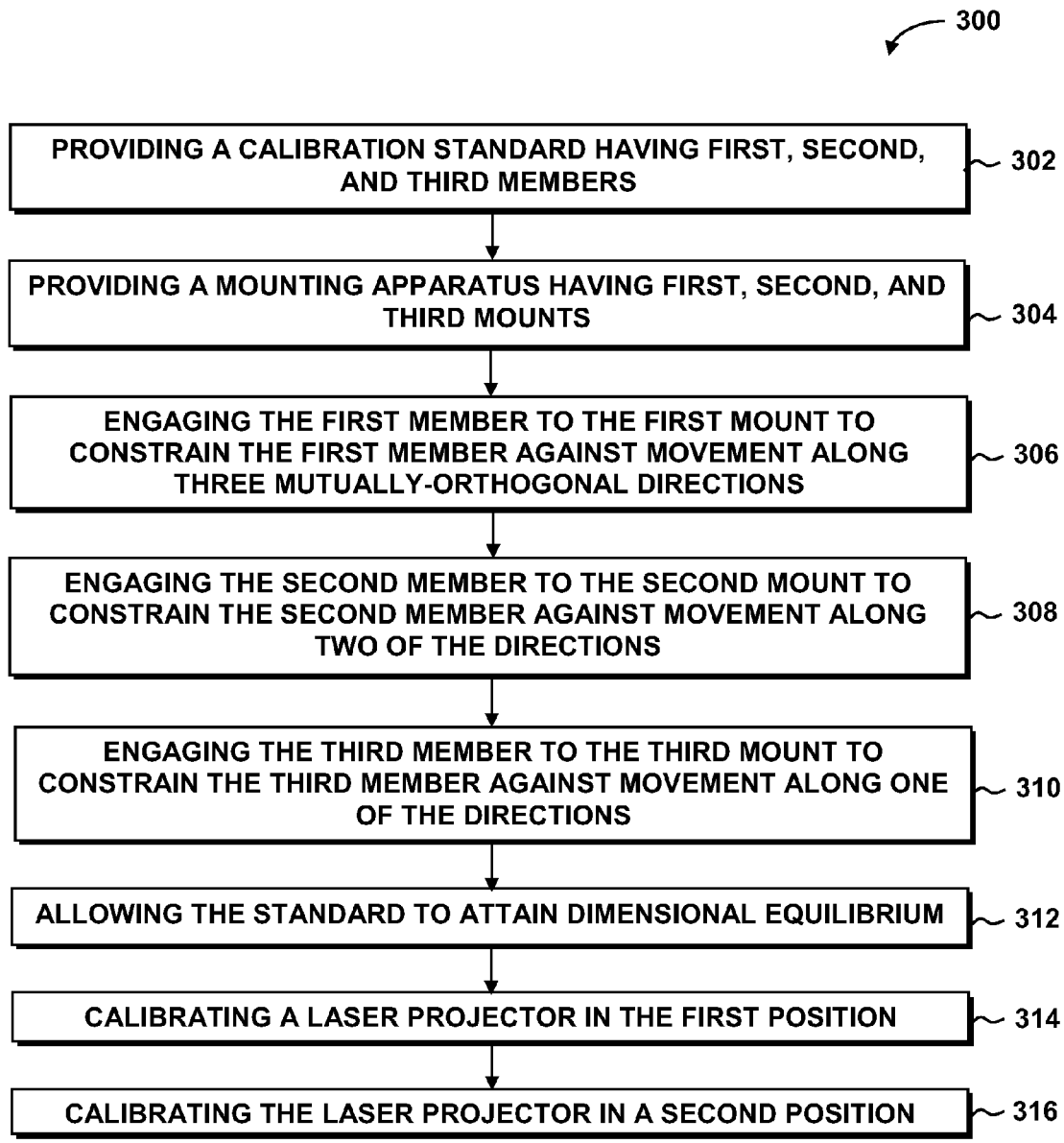
FIG. 21 is a flow chart illustrating one or more operations that may be included in a method of calibrating a laser projector.

FIG. 21 is a flowchart illustrating one or more operations that may be included in a method 300 for calibrating a laser projector 28 (FIG. 1). The method may be implemented by using the mounting apparatus 34 in conjunction with the calibration standard 150 described above and illustrated in FIGS. 1-20.

Step 302 of the method 300 of FIG. 21 may include providing a calibration standard 150 (FIG. 1) having first, second, and third members 120, 122, 124 that are at least partially spherically-shaped. As indicated above, the first, second, and third members 120, 122, 124 may be fixedly coupled to the calibration standard 150 in a manner illustrated in FIGS. 4-6 and 10-11. As indicated above, the first, second, and third members 120, 122, 124 are provided in a triangular pattern 58.

Step 304 of the method 300 of FIG. 21 may include providing a mounting apparatus 34 comprising first, second, and third mounts 60, 80, 100 that may be fixedly mounted to a fixture 50. For example, FIGS. 4-6 illustrate an embodiment of a mounting apparatus 34 having the first, second, and third mounts 60, 80, 100 arranged in a triangular pattern 58 that is complementary to the triangular pattern 58 of the first, second, and third members 124 of the calibration standard 150.

Step 306 of the method 300 of FIG. 21 may include engaging the first member 120 to the first mount 60. The first mount 60 may be configured such that the first member 120 is constrained against movement along the three mutually-orthogonal directions. For example, as shown in FIGS. 4-6, the first member 120 is constrained against movement along the horizontal direction 44, the forward-aft direction 46, and the vertical direction 48.

Step 308 of the method 300 of FIG. 21 may include engaging the second member 122 to the second mount 80. The second mount 80 may be configured to constrain the second member 122 against movement along the forward-aft direction 46 and the vertical direction 48. The second mount 80 may allow the second member 122 to move unrestrained along the horizontal direction 44 as described above.

Step 310 of the method 300 of FIG. 21 may include engaging the third member 124 to the third mount 100. In an embodiment, the third mount 100 (FIG. 4) may be configured as a planar surface 104 (FIG. 4) located vertically above the first mount 60 (FIG. 4) and the second mount 80 (FIG. 4). The planar surface 104 may be configured to constrain the third member 124 (FIG. 4) against movement along the forward-aft direction 46 (FIG. 4). The third mount 100 may allow unrestrained movement of the third member 124 along the horizontal direction 44 (FIG. 4) and the vertical direction 48 (FIG. 4).

Step 312 of the method 300 of FIG. 21 may include mounting the calibration standard 150 (FIG. 4) in one of the mounting apparatuses 34 (FIG. 4) in a work zone 10 (FIG. 3) and allowing the calibration standard 150 to attain dimensional equilibrium prior to calibrating a laser projector. For example, when the calibration standard 150 is initially mounted in the mounting apparatus, the calibration standard 150 may be at a different temperature relative to the ambient air temperature in the work zone 10. The calibration standard 150 may be allowed to remain undisturbed in the mounting apparatus 34 for a period of time until the calibration standard 150 attains temperature equilibrium with the ambient air temperature in the work zone 10 prior to calibrating the laser projector 28 (FIG. 1) using the calibration standard 150.

In this regard, prior to calibrating the laser projector 28 using the standard, the configuration of the first mount 60, second mount 80, and third mount 100 in cooperation with the spherical configuration of the first member 120, second member 122 and third member 124 may allow the calibration standard 150 to thermally expand or thermally contract in an unrestrained manner in an in-plane direction and/or in an out-of-plane direction as shown in FIG. 4. In addition, the calibration standard 150 may be allowed to remain undisturbed in the mounting apparatus 34 for a period of time to allow the calibration standard 150 to attain mass distribution equilibrium as described above prior to calibrating the laser projector 28 as described above.

Step 314 of the method 300 of FIG. 21 may include calibrating the laser projector 28 (FIG. 2) in a first position 36 (FIG. 2) using the mounting apparatus 34. As was previously indicated, the calibration standard 150 (FIG. 17) may include measurement targets 172 (FIG. 17) and/or measurement patterns 200 (FIG. 17) provided on the calibration standard 150. As was also mentioned above, the work zone 10 (FIG. 1) may include jig targets 26 (FIG. 1) mounted at one or more locations on the assembly jig 12, on the article 14 (FIG. 1), on the floor, ceiling, and/or walls of the work zone 10, and on other structure that may be located in the work zone 10.

With the calibration standard 150 (FIG. 1) installed in a mounting apparatus 34 (FIG. 1) in the first position, the laser projector 28 (FIG. 1) may be activated and measurements may be taken regarding the deviation of the projection of the laser beam 32 (FIG. 1) onto the measurement targets 172 (FIG. 1) on the calibration standard 150. A high-accuracy measurement system (not shown) such as a photogrammetry system, a laser tracker, or other high-accuracy measurement system may initially be used to measure the location of the measurement targets 172 of the calibration standard 150 relative to the jig targets 26 (FIG. 1). During the measurement of the measurement targets 172 using the high-accuracy measurement system, the calibration standard 150 may be temporarily removed from the mounting apparatus 34 and then re-installed in the mounting apparatus 34 in the same position and orientation. A second set of measurements may be taken using the high-accuracy measurement system to determine the locations of the measurement targets 172 on the calibration standard 150. The process may be repeated several times to establish the repeatability of the location of the measurement targets 172 toward which a laser beam 32 will later be projected by the laser projector 28 for calibrating the laser projector at that location (e.g., at the first position of the work zone 10).

A data file (not shown) may then be generated by the high-accuracy measurement system based on the repeated measurements of the measurement targets 172 in the first position 36. The data file may represent the location and orientation of the measurement targets 172 on the calibration standard 150 relative to the jig targets 26 on the assembly jig 12 and relative to the jig targets 26 at other locations in the work zone 10 such as on the floor (FIG. 1). Advantageously, the unrestrained movement capability provided by the first mount 60, the second mount 80, and the third mount 100 (FIG. 4) of the mounting apparatus 34 allows the measurement targets 172 of the calibration standard 150 to repeatedly assume substantially the same location each time the calibration standard 150 is removed and re-installed in the mounting apparatus 34 at the given position (e.g., at the first position 36). The repeatability of the location of the calibration standard 150 may establish the reliability of the measurement data at the given position.

With the calibration standard 150 at the first position, the laser projector 28 may then project specifically-sized test circles (not shown) onto jig targets 26 to analyze galvanometer (not shown) interaction accuracy of the laser projector 28. The diameter of the projected test circles may be dependent upon the distance from the jig targets 26 to the laser projector 28. For example, the test circles may be projected at a diameter of approximately 0.25 to 0.59 inch for a distance of approximately 20 feet between the measurement targets 172 and the laser projector 28. Larger test circles may be projected for greater distances between the measurement targets 172 and the laser projector 28. The projection of the test circles may provide an indication of the positional accuracy of the laser beam 32 (FIG. 1) and the accuracy of the beam width (not shown) of the laser beam 32. Measurement patterns 200, 202, 204, 206, 208 (FIGS. 17-20) may also be projected onto the calibration standard 150 (FIG. 1) to provide a further indication of the interaction accuracy of the galvanometers (not shown) of the laser projector 28. The laser projector 28 may be calibrated based on the deviation of the laser beam 32 from the measurement targets 172 and the quality of the laser beam 32 in projecting the measurement patterns 200 onto the calibration standard 150.

Step 316 of the method 300 of FIG. 21 may include calibrating the laser projector 28 (FIG. 1) in a second position 38 (FIG. 1) using the mounting apparatus 34 (FIG. 1) using the same process described above in Step 314 for the calibration standard 150 in the first position 36. The calibration standard 150 (FIG. 1) may be sequentially mounted to different mounting apparatuses 34 located at different positions (e.g., third position 40) in the work zone 10 (FIG. 1). The mounting apparatuses 34 may also be located at different positions (not shown) on the assembly jig 12 to measure and account for thermal expansion or thermal contraction of the assembly jig 12. The laser projector 28 may be calibrated at each one of the positions in the work zone 10 (FIG. 1). In this manner, the laser projector 28 may be calibrated for accuracy within the operational volume of the work zone 10. After calibration of the laser projector 28 at one or more positions within the work zone, the laser projector 28 may accurately locate parts, hole patterns 24 (FIG. 1), and other features of an article 14 (FIG. 1) that may be mounted on the assembly jig 12 in the work zone 10.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A mounting apparatus for repeatable positioning of an item, comprising:
   a first mount configured to receive a first member fixedly coupled to an item, the first member being at least partially-spherically shaped, the first mount including at least three points engaged to and non-movably supporting the at least partially-spherically shape portion of the first member and positively constraining the first member against movement along three mutually-perpendicular directions;
   a second mount positioned in fixed relation to the first mount and configured to receive a second member fixedly coupled to the item and positively constrain the second member against movement along exactly two of the three mutually-perpendicular directions; and
   a third mount configured as an at least partially-planer surface located above and positioned in fixed relation to the first and second mount and configured to receive a third member fixed coupled to the item and positively constrain the third member against movement along exactly one of the three mutually-perpendicular directions;
   the first, second, and third members being engaged to the respective first, second, and third mounts in a manner such that the item is unrestrained against movement along three mutually-orthogonal directions.

2. The mounting apparatus of claim 1 wherein:
   the first, second, and third mounts are fixedly mounted to a fixture.

3. The mounting apparatus of claim 2 wherein:
   the fixture comprises a base portion and a vertical member extending upwardly from the base portion;
   the first and second mount being mounted to the base portion; and
   the third mount being mounted to the vertical member.

4. The mounting apparatus of claim 1 wherein at least one of the first, second and third mount is configured as follows:
   the first mount has a conical surface formed in an upper end of the first mount;
   the second mount comprises a V-block; and
   the third mount comprises a plate member located above the first and second mount.

5. The mounting apparatus of claim 1 wherein:
   the first, second, and third mount define a triangular pattern for mounting the item.

6. The mounting apparatus of claim 1 wherein:
   the first, second, and third mounts are arranged to support the item in a manner such that a weight of the item causes the item to be positively positioned relative to the first, second, and third mounts.

7. The mounting apparatus of claim 6 wherein:
   the first, second, and third mounts are positioned relative to one another such that the item, when supported by the mounting apparatus, is oriented at a mounting angle of less than approximately 10 degrees relative to vertical.

8. The mounting apparatus of claim 1 wherein:
   each one of the first, second, and third members extends laterally outwardly from an edge of the item to engage the respective first, second, and third mounts.

9. The mounting apparatus of claim 1 wherein:
   at least one of the first, second, and third members comprises a sphere.

10. The mounting apparatus of claim 1 wherein:
    the item comprises a calibration standard.

11. The mounting apparatus of claim 10 wherein:
    the calibration standard is comprised of a panel member; and
    the panel member comprises a sandwich structure having opposing face sheets and a core interposed between the face sheets.

12. The mounting apparatus of claim 11 wherein:
    the core is formed of honeycomb material.

13. A calibration system for a laser projector, comprising:
    a calibration standard having at least three partially-spherical members mounted thereto in a triangular pattern; and
    mounting apparatus for repeatably positioning the calibration standard, the mounting apparatus including:
    a first mount configured to support a first member fixedly coupled to the calibration standard, the first member being at least partially-spherically shaped, the first mount including at least three points engaged to and non-movably supporting the at least partially-spherically shaped portion of the first member and positively constrain the first member against movement along three mutually-perpendicular directions;
    a second mount positioned in fixed relation to the first mount and configured to receive a second member fixedly coupled to the calibration standard and positively constrain the second member against movement along exactly two of the three mutually-perpendicular directions; and a third mount configured as an at least partially-planar surface located above and positioned in fixed relation to the first and second mount and configured to receive a third member fixedly coupled to the calibration standard and positively constrain the third member against movement along exactly one of the three mutually-perpendicular directions;

the first, second, and third members being engaged to the respective first, second, and third mounts in a manner such that the calibration standard is unrestrained against movement along three mutually-orthogonal directions.

\* \* \* \* \*